No. 734,815. PATENTED JULY 28, 1903.
A. W. CASH.
SHAFT COUPLING.
APPLICATION FILED JAN. 20, 1903.
NO MODEL.
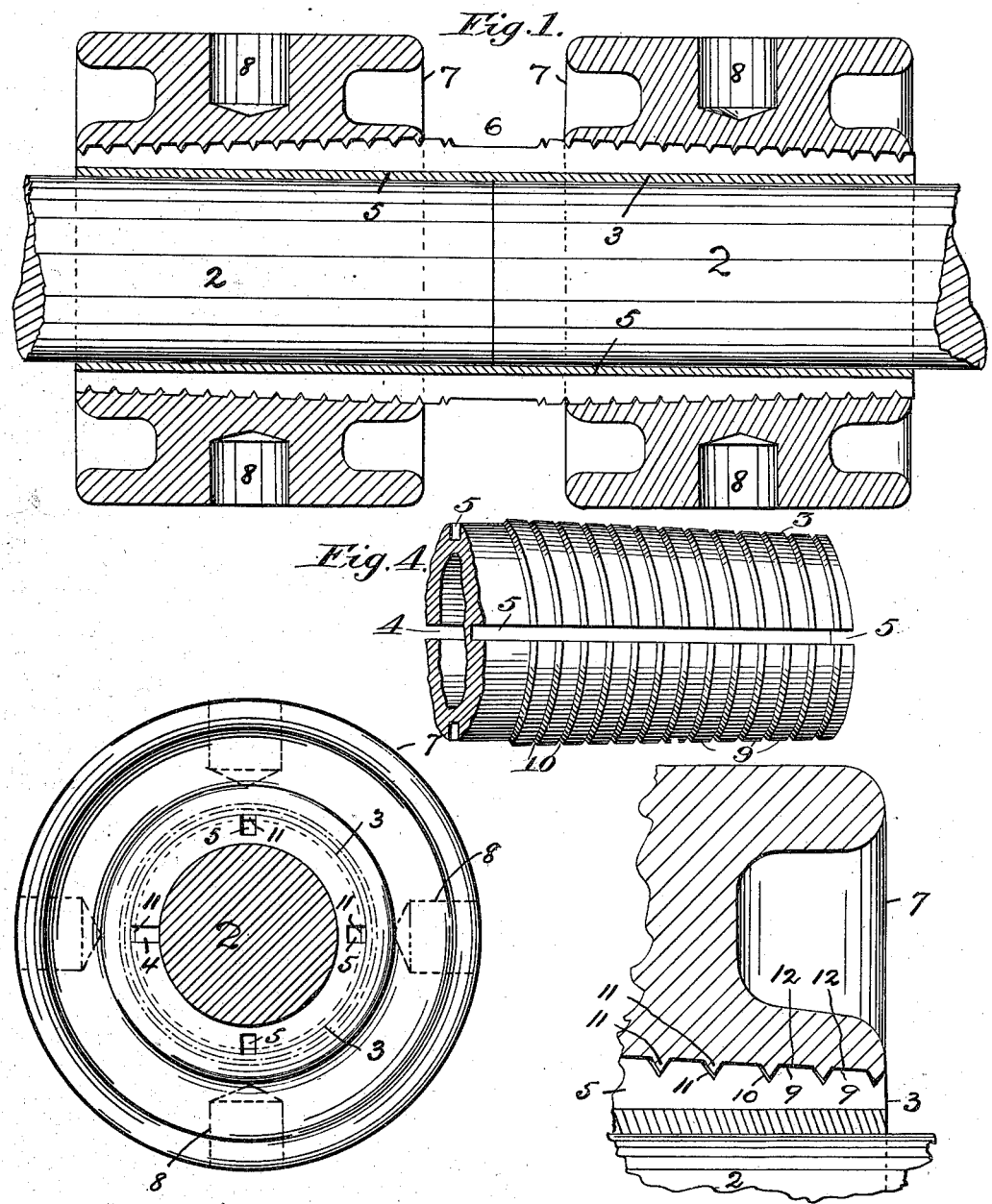
WITNESSES: INVENTOR:
Arthur W. Cash,
BY
ATTORNEYS.

No. 734,815.

Patented July 28, 1903.

UNITED STATES PATENT OFFICE.

ARTHUR W. CASH, OF NEWARK, NEW JERSEY.

SHAFT-COUPLING.

SPECIFICATION forming part of Letters Patent No. 734,815, dated July 28, 1903.

Application filed January 20, 1903. Serial No. 139,849. (No model.)

*To all whom it may concern:*

Be it known that I, ARTHUR W. CASH, a citizen of the United States, residing at Newark, in the county of Essex and State of New Jersey, have invented and produced a new and original Improvement in Shaft-Couplings; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to provide a shaft-coupling of minimum weight, cost of material, and labor to manufacture, to secure simplicity of construction and ease of application, to provide for positive alinement and accurate joining of the adjacent shaft ends, and to obtain other advantages and results, some of which may be referred to hereinafter in connection with the description of the working parts.

The invention consists in the improved coupling and in the arrangements and combinations of parts of the same, all substantially as will be hereinafter set forth, and finally embraced in the clauses of the claim.

Referring to the accompanying drawings, in which like figures of reference indicate corresponding parts in each of the several figures, Figure 1 is a longitudinal central section of two shaft ends joined by my improved coupling. Fig. 2 is an end view of the same; and Fig. 3, an enlarged portion of Fig. 1, showing the exterior thread of the sleeve in detail. Fig. 4 is an exterior view of the sleeve in perspective.

In said drawings, 2 2 indicate the adjacent ends of sections of shafting which it is desired to couple together, and 3 represents a sleeve slipped upon and overlying both said shaft ends. Said sleeve is made of resilient or yielding iron, steel, or other suitable material and is longitudinally slotted along one side, as at 4, said slot providing sufficient space for the sleeve to be compressed to firmly grip the shaft without the edges coming in contact, as will be understood. The sleeve 3 is also provided at its exterior surfaces with grooves 5, extending longitudinally and being cut partially through the thickness of the sleeve to give to it a greater flexibility in closing upon the shaft ends. Said grooves are preferably three in number and, together with the slot 4, are arranged, as shown in the drawings, at a quadrant's distance apart on the circumference of the sleeve. Obviously, however, said grooves may be dispensed with if the sleeve has enough elasticity otherwise. The sleeve 3 is furthermore tapered at its exterior surface at or about its middle 6 toward its opposite ends, as shown, and said tapered portions are threaded to receive collars 7, having correspondingly-tapered and threaded apertures and being adapted to screw toward each other upon the opposite ends of the sleeve 3 to close the same upon the shaft ends.

Any convenient method of turning the collars 7 may be employed, although I have shown in the drawings radial sockets 8, into which a rod or bar (not shown) may be conveniently inserted. Obviously, however, the collars might be made angular to receive a wrench, and, furthermore, a plurality of collars may be employed upon each end of the sleeve, if desired.

It is in the particular manner of engagement of the collars 7 with the sleeve 3 that the present invention more particularly inheres, the object being to secure a minimum amount of friction therebetween in turning up the collars. To this end the screw-thread on the tapered ends of the sleeve 3 has a flat top 9 of abnormal width, as shown, and the groove 10 is larger than the corresponding thread 11 on the collar, as illustrated in Fig. 3 more particularly. This permits the flat bottom 12 of the groove in the collar to sit squarely and solidly upon the abnormal flat top 9 of the thread on the sleeve, and thus facilitates the transmission of pressure radially of the parts, while reducing to a minimum the frictional resistance to movement longitudinally. The thread 11 cannot wedge into or engage the bottom of its groove 10, but simply lies at one side against the side of the groove, as shown in Fig. 3. This construction enables the force applied by a lever or wrench to the collars 7 to be exerted radially inward to effectively compress or clamp the sleeve 3 on the ends of the shafts, only a very small portion of said force being lost or wasted in friction on the side walls of the threads.

Having thus described the invention, what I claim as new is—

1. In a shaft-coupling, a sleeve having exteriorly-tapering opposite ends and being slit at one side for its entire length, said sleeve having in its outer wall at a point opposite said slit an open groove, and other grooves each substantially half-way between said groove and slit, said sleeve having a screw-thread extending around each end regardless of said slit and grooves, and nuts or collars adapted to screw on said ends.

2. A shaft-coupling comprising a sleeve with oppositely-tapered screw-threaded ends, and having in its side an open slit and in its exterior surface one or more open grooves, said slit and groove or grooves extending longitudinally of the sleeve and having their opposite walls free to approach or separate, and compression-collars having correspondingly-screw-threaded tapered interiors and being adapted to screw onto the ends of said sleeve.

3. In a shaft-coupling, the combination with a compressible sleeve having a tapered portion with a spiral groove cut in the exterior thereof, the successive turns of said spiral being separated by entire superficial portions of the sleeve, of a collar having a correspondingly-tapered interior surface provided with a thread adapted to enter said groove on the sleeve, said thread being smaller than said groove in cross-section and adapted to lie loosely therein.

4. In a shaft-coupling, the combination with a compressible sleeve having an exteriorly-tapered portion with a spiral groove cut therein, the successive turns of said groove being separated by entire portions of the sleeve-surface, of a collar having a tapered opening adapted to receive the sleeve, said collar having interior threads smaller in the cross-section than the said groove in the sleeve and being slightly farther apart in outside measurement than the said threads.

5. In a shaft-coupling, the combination with a compressible sleeve adapted to receive the meeting ends of adjacent shaft-sections and having outwardly-tapered opposite ends with exterior spiral grooves therein whose successive turns are separated by entire superficial portions of the sleeve, of collars adapted to screw one on each end of said sleeve and having an interior thread smaller in cross-section than the said groove and adapted to enter the same loosely and permit the alternating portions of the interior of the collar to directly engage the entire portions of the sleeve.

6. In a shaft-coupling, a sleeve having oppositely-tapered screw-threaded ends, and correspondingly-tapered screw-threaded compression-collars adapted to screw onto said sleeve ends, the screw-threads on said sleeve having abnormally wide flat tops and contiguous inclined sides, and the screw-threads on the compression-collars being narrow and V-shaped and smaller than the spaces between the sleeve-threads and being separated by wide flat-bottomed spaces adapted to receive the wide flat-topped threads on the sleeve.

In testimony that I claim the foregoing I have hereunto set my hand this 9th day of January, 1903.

ARTHUR W. CASH.

Witnesses:
FRANK H. BLISS, Jr.,
THEO. A. TAYLOR, Jr.